(12) United States Patent
Porat

(10) Patent No.: US 10,389,627 B2
(45) Date of Patent: Aug. 20, 2019

(54) STATE-DEPENDENT DATA FORWARDING

(71) Applicant: Huawei Technologies Co., Ltd., Shenzhen (CN)

(72) Inventor: Hayim Porat, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 100 days.

(21) Appl. No.: 15/256,229

(22) Filed: Sep. 2, 2016

(65) Prior Publication Data
US 2016/0373349 A1 Dec. 22, 2016

Related U.S. Application Data

(63) Continuation of application No. PCT/EP2014/054141, filed on Mar. 4, 2014.

(51) Int. Cl.
*H04L 12/715* (2013.01)
*H04L 12/721* (2013.01)
(Continued)

(52) U.S. Cl.
CPC .............. *H04L 45/64* (2013.01); *H04L 45/38* (2013.01); *H04L 41/20* (2013.01); *H04L 45/302* (2013.01); *H04L 45/44* (2013.01); *H04L 49/15* (2013.01)

(58) Field of Classification Search
CPC ....... G06F 9/455; H04L 12/74; H04L 12/741; H04L 12/861; H04L 45/34; H04L 49/9042; H04L 45/64; H04W 76/04
See application file for complete search history.

(56) References Cited

U.S. PATENT DOCUMENTS 6,034,963 A 3/2000 Minami et al.
8,830,823 B2 * 9/2014 Koponen ............ H04L 12/4633
370/219
(Continued)

FOREIGN PATENT DOCUMENTS

CN 1237295 A 12/1999
CN 1529964 A 9/2004
(Continued)

OTHER PUBLICATIONS

Astuto et al., "A Survey of Software-Defined Networking: Past, Present, and Future of Programmable Networks," IEEE Communications Surveys and Tutorials, pp. 0-17, Institute of Electrical and Electronic Engineers, New York, New York (Oct. 29, 2013).
(Continued)

*Primary Examiner* — Andrew Lai
*Assistant Examiner* — Andrew C Lee
(74) *Attorney, Agent, or Firm* — Leydig, Voit & Mayer, Ltd.

(57) ABSTRACT

A method for forwarding a data flow of multiple data packets according to a protocol adapted for locally-managed data forwarding in a software-defined networking (SDN) architecture includes entering each data packet of the data flow of multiple data packets to a data communication forwarding entity (FE). At the forwarding entity, the next destination of the data packet is selected by applying state machine logic to at least one field of the data packet and to state information tracked by the forwarding entity before the data packet is received. The state machine logic includes rules for forwarding the data packet.

20 Claims, 9 Drawing Sheets

(51) Int. Cl.
  *H04L 12/725* (2013.01)
  *H04L 12/24* (2006.01)
  *H04L 12/933* (2013.01)

(56) References Cited

U.S. PATENT DOCUMENTS

| | | | |
|---|---|---|---|
| 2003/0016663 A1 | 1/2003 | Mauritz et al. | |
| 2006/0046716 A1* | 3/2006 | Hofstaedter | H04B 1/0003 455/432.2 |
| 2010/0322141 A1 | 12/2010 | Liu et al. | |
| 2011/0087774 A1* | 4/2011 | Pope | G06F 9/4856 709/224 |
| 2013/0060929 A1* | 3/2013 | Koponen | H04L 12/4633 709/224 |
| 2014/0280834 A1* | 9/2014 | Medved | H04L 47/122 709/223 |
| 2014/0362775 A1* | 12/2014 | Steiner | G06F 9/45558 370/329 |
| 2014/0362861 A1* | 12/2014 | Norridge | H04L 45/34 370/392 |

FOREIGN PATENT DOCUMENTS

| | | |
|---|---|---|
| CN | 101971664 A | 2/2011 |
| CN | 102123082 A | 7/2011 |
| CN | 103514245 A | 1/2014 |
| WO | WO 2013074847 A1 | 5/2013 |
| WO | 2015131929 A1 | 9/2015 |

OTHER PUBLICATIONS

"IEEE Standard for Information technology—Telecommunications and information exchange between systems—Local and metropolitan area networks—Specific requirements Part 3: Carrier Sense Multiple Access with Collision Detection (CSMA/CD) Access Method and Physical Layer Specifications Amendment: Media Access Control Parameters, Physical Layers, and Management Parameters for Subscriber Access Networks," IEEE Standards, pp. 1-640, Institute of Electrical and Electronics Engineers, New York, New York (Sep. 7, 2004).

"OpenFlow Switch Specification," Version 1.4.0, pp. 1-206, Open Networking Foundation, Palo Alto, California (Oct. 14, 2013).

"Service-Aware Network Architecture Based on SDN, NFV, and Network Intelligence," White Paper Intel Architecture Processors Qosmos DPI Technology Networking and Communications, pp. 1-8, Intel Corporation, Santa Clara, California (2013).

Song, Haoyu, "Protocol-Oblivious Forwarding: Unleash the Power of SDN through a Future-Proof Forwarding Plane," Hot Topics in Software Defined Networking, pp. 127-132, ACM, New York, New York (Aug. 16, 2013).

"Split Architecture for Large Scale Wide Area Networks," SPARC, ICT-258457, Deliverable D3.3, pp. 1-129, SPARC consortium, Berlin, Germany, (Dec. 1, 2011).

CN 201480076760.9, Office Action and Search Report, dated Sep. 5, 2018.

CN/2014800767609, Search Report, dated Jan. 25, 2019.

\* cited by examiner

| Match Fields | Priority | Counters | Instructions | Timeouts | Cookie |
|---|---|---|---|---|---|

FIGURE 4A

| Flow ID | | Match Fields | Priority | Counters | Instructions | Timeouts | Cookie | Context | | State machine i | | |
|---|---|---|---|---|---|---|---|---|---|---|---|---|
| | | | | | | | | TLV1 | TLV n | id | State 1 | State k |
| Flow i | Ingress | | | | | | | | | | | |
| | Egress | | | | | | | | | | | |

FIGURE 4B

STATE-DEPENDENT DATA FORWARDING

CROSS-REFERENCE TO RELATED APPLICATIONS

This application is a continuation of International Patent Application No. PCT/EP2014/054141, filed on Mar. 4, 2014, which is hereby incorporated by reference in its entirety.

BACKGROUND

The present disclosure, in some embodiments thereof, relates to state-dependent data forwarding and, more specifically, but not exclusively, to state-dependent data forwarding in a software-defined network.

OpenFlow is an emerging standard and protocol for creating software-defined networks (SDN). The OpenFlow protocol includes programmable forwarding elements that are characterized by their ability to be programmable by an external controller. The controller programs the OpenFlow Forwarding Element (FE), also called Forwarding Entity, by adding entries to forwarding tables whose structure is also defined by the OpenFlow protocol. The premise in OpenFlow and SDN is that the first frame of each new data flow is sent to the controller which in turn, after analyzing the frame headers, sends forwarding rules to all of the participating FEs. All of the subsequent frames of the same flow are handled by the OpenFlow FEs and are not sent to the controller, thus lowering the burden on controller resources.

However, the premise is broken if there is a need to monitor a state (or states) for a given data flow. The rules embodied in the OpenFlow table are stateless, meaning the forwarding decision per frame is dependent only on the information contained in the frame (e.g. values of its headers). Any decision that depends on a current or historical state must be sent to the controller, which therefore needs to handle many more packets than the original design called for.

Moreover, since in OpenFlow there are only stateless forwarding rules, there is no notion of a flow as a set of interrelated ingress and egress streams of traffic between participating hosts, i.e. when A is allowed to communicate with B then there are two rules, one for A→B(egress) and one for A←B(Ingress). In addition, there is no notion of a flow context for a flow, such as the port it came from, the virtual machine (VM) that sent it, etc.

In one solution, for any state-dependent operation on a data flow all of the frames related to the given flow are sent to the controller where either the controller or a related SDN application is used to process all of the frames. Thus instead of efficient operation at the FE level, which is optimized for packet processing both in term of location and in terms of adaptation, frames need to be delivered to a remote point with all of the inefficacies resulting from the delivery.

Furthermore, there are major use cases for which there is no solution in OpenFlow whatsoever, not even by sending data frames to controller, as they are based on a frame by frame decision. Examples include:
1) State-dependent firewall;
2) Link Aggregation (LAG);
3) Operation, Administration, and Management (OAM) (for example 802.3 ah link OAM);
4) APS (Automatic Protection Switching);
5) Load balancing; and
6) Bandwidth (BW) capping.

There is currently no efficient SDN solution for data forwarding in cases in which data forwarding is based on a frame by frame decision.

In some cases external components are added to the OpenFlow switch, for example IP tables for a firewall, port group for LAG. However these solutions are tailored for a specific use case, are not connected to the SDN framework. This results in non-optimal resource utilization due to redundant functionality on the switch and external components. Additionally, such solutions are not relevant for hardware-based OpenFlow switches.

Other solutions add the full functionality of state-dependent applications to the FE (for example a firewall SDN application). This approach is wasteful because all frames need to be sent to the SDN controller and back to the FE, thus limiting the scale of the SDN controller as it needs to track a large number of data flows.

Additional background art includes:
Open Networking Foundation OpenFlow Switch Specification; and
Intel® Architecture Processors White Paper on "Service-Aware Network Architecture Based on SDN, NFV and Network Intelligence".

SUMMARY

According to a first aspect of the present disclosure there is provided a method for forwarding a data flow of multiple data packets according to a protocol adapted for locally-managed data forwarding in a software-defined networking (SDN) architecture. The method includes entering each data packet of the data flow of multiple data packets to a data communication forwarding entity. At the forwarding entity, the next destination of the data packet is selected by applying state machine logic to at least one field of the data packet and to state information tracked by the forwarding entity before the data packet is received. The state machine logic includes rules for forwarding the data packet.

In a first possible implementation according to the first aspect, applying state machine logic determines actions to be executed on the data packet by the forwarding entity, and the method further includes executing the actions on the packet prior to the forwarding.

In a second possible implementation form according to the first aspect as such or according to the first implementation form of the first aspect, the state information includes at least one of: a network state of a network transferring the data packet from a sender of the packet to a destination of the packet, a forwarding entity state of the data communication forwarding entity, a packet state of the input data packet, a data flow state of a data flow comprising the input data packet, policy data of the network, event information of an event logged before the data packet is received, a state machine identifier (ID) identifying a respective state machine logic to apply to a data packet, and flow context of the data flow.

In a third possible implementation form according to the first aspect as such or according to the any of the preceding implementation forms of the first aspect, the method further includes defining, upon initiation of the data flow, a respective state machine logic for applying to the data packets of the data flow.

In a fourth possible implementation form according to the first aspect as such or according to the any of the preceding implementation forms of the first aspect, the method further includes determining that current state machine logic requires updating, and updating the state machine logic prior to applying the state machine logic to the data packet.

In a fifth possible implementation form according to the first aspect as such or according to the any of the preceding implementation forms of the first aspect, the method further includes further comprising packaging at least some state information with the data packet prior to the forwarding.

In a sixth possible implementation form according to the first aspect as such or according to the any of the preceding implementation forms of the first aspect, the method further includes generating frames at the forwarding entity for forwarding to the next destination, in accordance with instructions of the state machine logic.

In a seventh possible implementation form according to the first aspect as such or according to the any of the preceding implementation forms of the first aspect, the method further includes determining the state machine logic for application to the data packet by matching at least one field of the data packet to a flow table maintained by the forwarding entity, wherein the flow table includes an identifier of respective state machine logic for the data packet.

In a eighth possible implementation form according to the first aspect as such or according to the any of the preceding implementation forms of the first aspect, the flow table includes at least one field for storing state information, and further comprising tracking state information during the data flow and updating the at least one field for storing state information in the flow table when a change to the tracked state information is detected.

In a ninth possible implementation form according to the first aspect as such or according to the any of the preceding implementation forms of the first aspect, the protocol is the OpenFlow protocol.

According to a second aspect of the present disclosure there is provided a Software-defined network (SDN) controller for stat-dependent data forwarding, wherein a data flow of a plurality data packets is forwarded according to a protocol adapted for locally-managed data forwarding in a SDN architecture. Each data packet of said plurality of data packets is entered to a data communication forwarding entity (FE). At said FE, a next destination of said data packet is selected by applying state machine logic to at least one field of said data packet and to state information tracked by said FE before said data packet is received, wherein said state machine logic comprises rules for forwarding said data packet; and said data packet is forwarded to said selected next destination.

In a first possible implementation according to the second aspect, applying state machine logic determines actions to be executed on the data packet by the forwarding entity, and the method further includes executing the actions on the packet prior to the forwarding.

In a second possible implementation form according to the second aspect as such or according to the first implementation form of the second aspect, the state information includes at least one of: a network state of a network transferring the data packet from a sender of the packet to a destination of the packet, a forwarding entity state of the data communication forwarding entity, a packet state of the input data packet, a data flow state of a data flow comprising the input data packet, policy data of the network, event information of an event logged before the data packet is received, a state machine identifier (ID) identifying a respective state machine logic to apply to a data packet, and flow context of the data flow.

In a third possible implementation form according to the second aspect as such or according to the any of the preceding implementation forms of the second aspect, the method further includes defining, upon initiation of the data flow, a respective state machine logic for applying to the data packets of the data flow.

In a fourth possible implementation form according to the second aspect as such or according to the any of the preceding implementation forms of the second aspect, the method further includes determining that current state machine logic requires updating, and updating the state machine logic prior to applying the state machine logic to the data packet.

In a fifth possible implementation form according to the second aspect as such or according to the any of the preceding implementation forms of the second aspect, the method further includes further comprising packaging at least some state information with the data packet prior to the forwarding.

In a sixth possible implementation form according to the second aspect as such or according to the any of the preceding implementation forms of the second aspect, the method further includes generating frames at the forwarding entity for forwarding to the next destination, in accordance with instructions of the state machine logic.

In a seventh possible implementation form according to the second aspect as such or according to the any of the preceding implementation forms of the second aspect, the method further includes determining the state machine logic for application to the data packet by matching at least one field of the data packet to a flow table maintained by the forwarding entity, wherein the flow table includes an identifier of respective state machine logic for the data packet.

In a eighth possible implementation form according to the second aspect as such or according to the any of the preceding implementation forms of the second aspect, the flow table includes at least one field for storing state information, and further comprising tracking state information during the data flow and updating the at least one field for storing state information in the flow table when a change to the tracked state information is detected.

In a ninth possible implementation form according to the second aspect as such or according to the any of the preceding implementation forms of the second aspect, the protocol is the OpenFlow protocol.

According to a third aspect of the present disclosure there is provided a computer program product for forwarding data packets, the computer program product comprising a computer readable storage medium having program instructions embodied therewith, the program instructions executable by a data network forwarding entity to cause the forwarding entity to input data packets, via an ingress port of the forwarding entity; process the input data packets according to a protocol adapted for locally-managed data forwarding in a software-defined networking (SDN) architecture, by a processor of the forwarding entity, to identify respective next destinations of the data packets; and forward the data packets, via an egress port of the forwarding entity, to the respective next destinations. The processor selects the next destination of the data packet by applying state machine logic to at least one field of the data packet using state information tracked by the forwarding entity before the data packet is received. The state machine logic includes rules for at least one of: forwarding the data packet and determining actions to be executed on the data packet by the forwarding entity.

In a first possible implementation according to the third aspect, the state information includes at least one of: a network state of a network transferring the data packet from a sender of the packet to a destination of the packet, a forwarding entity state of the data communication forwarding entity, a packet state of the input data packet, a data flow state of a data flow comprising the input data packet, policy data of the network, event information of an event logged before the data packet is received, a state machine identifier (ID) identifying a respective state machine logic to apply to a data packet, and flow context of the data flow.

In a second possible implementation form according to the third aspect as such or according to the first implementation form of the third aspect, the program instructions executable by the data network forwarding entity cause the forwarding entity to generate the state machine logic from data packaged with the data packet.

In a third possible implementation form according to the first aspect as such or according to the any of the preceding implementation forms of the first aspect, the program instructions executable by the data network forwarding entity cause the forwarding entity to: input information from a user defining a state machine, using a user interface; and generate the state machine logic from the user-defined state machine, by the processor.

In a third possible implementation form according to the first aspect as such or according to the any of the preceding implementation forms of the first aspect, the program instructions executable by the data network forwarding entity cause the forwarding entity to select the state machine logic for application to the data packet, by the processor, by matching at least one field of the data packet to a flow table maintained by the forwarding entity, wherein the flow table includes an identifier of the state machine logic.

Unless otherwise defined, all technical and/or scientific terms used herein have the same meaning as commonly understood by one of ordinary skill in the art to which the disclosure pertains. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

FIG. 4A is an exemplary stateless flow table compatible with the OpenFlow protocol.

FIG. 4B is an exemplary flow table which includes state information, according to embodiments of the disclosure.

DETAILED DESCRIPTION

Figure 1:
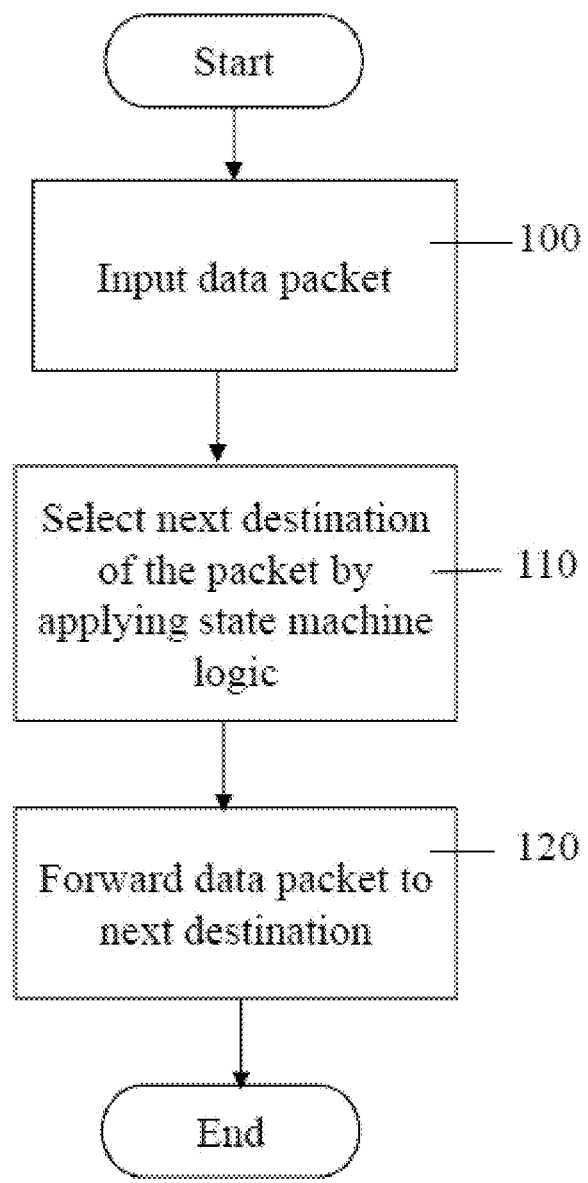
FIG. 1 is a simplified flowchart of a method of forwarding a data flow of data packets, according to embodiments of the present disclosure.

Software-defined networking (SDN) is an approach to networking in which control is decoupled from hardware and given to software applications running on the hardware element. Under SDN, forwarding elements may include programmable applications running on the FEs which determine the path of data packets through a network.

As used herein the phrase "forwarding element" (also denoted herein an FE) means any hardware, software or firmware element which inputs a data packet and outputs the data packet to the next destination in the data packet's route toward the packet's final destination. The terms "forwarding entity" and FE are not limiting to any particular type of network element or protocol. Switches and routers are non-limiting examples of FEs.

The embodiments herein provide state-dependent forwarding of data through a forwarding element (FE). The FE tracks state information that is relevant for a given data flow. By tracking state information within the FE, it is possible for the FE to make forwarding decisions which takes the state information into account, optionally without further input from a controller and/or other external network element. These decisions may be made using state machine logic applied to information in the data packet or frame along with the tracked state information. The state machine logic determines how the data packet should be forwarded towards the final destination, and may specify other actions which should be performed.

Before explaining at least one embodiment of the disclosure in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein the term "stateful" means state-dependent. In a non-limiting example, a stateful flow table is a flow table which implements different rules based on the state of at least one field of the flow table, as described below.

As used herein the term "controller" means any hardware, software or firmware element of the data network that programs forwarding rules in the FE and is external to the FE. The controller may be centralized or distributed in the data network.

As used herein the phrase "next destination" means the network element or node immediately following the FE which is forwarding the data packet. In some cases the next destination is a subsequent forwarding element along the data packet's route. In other cases the next destination is the data packet's final destination.

As used herein the phrases "locally-managed routing" and "locally-managed forwarding" mean that, for at least some data packets of a data flow, the forwarding element determines the data packet's next destination and/or actions without requiring explicit information from the controller. It is to be understood that the locally-managed forwarding may be based at least in part on rules provided by the controller and/or programmed into the forwarding element by the controller, prior to receiving the data packet.

As used herein the phrase "state machine" means a module, segment, or portion of instructions which comprises one or more executable instructions for implementing state machine logic.

Reference is now made to FIG. 1, which is a simplified flowchart of a method of forwarding a data flow of data packets based on state information, according to embodiments of the present disclosure. The data flow is implemented with a protocol adapted for locally-managed data forwarding in an SDN architecture. OpenFlow is a non-limiting example of such a protocol.

FIG. 1 relates to data packets whose next destination may be decided at the forwarding element, optionally without being sent to a controller. In certain cases, for example for the initial data packet of a new data flow, it may be necessary to perform preliminary steps in order to implement locally-managed routing, as described below.

In 100 a data packet routed in a digital network enters a data communication FE. The data packet is part of a sequence of data packets (denoted herein a data flow) which are forwarded from a sender to a destination through the data network via one or more FEs. Forwarding rules may be applied to each data packet independently; therefore data packets forming a data flow may not necessarily follow the same route through the data network and/or may not undergo the same actions. The data packet may include metadata and other fields which are used to determine the data packet's next destination. However in the present embodiments not every data packet may include all the information needed by the FE in order to determine the data packet's next destination and/or relevant actions. Additional data (denoted herein state information) is tracked by the FE, in order to enable the FE to select the data packet's next destination and/or relevant actions without sending the data packet to a controller or other external element.

As used herein the phrase "state information" means information regarding the state of parameters internal and/or external to the FE and/or information regarding flow context. At least some of the state information is tracked by the FE and serve as parameters of the state machine logic.

In some embodiments of the present disclosure, the state information includes one or more of:
 a) A state of the network transferring the data packet from a sender of the packet to a destination of the packet;
 b) A state of the FE;
 c) A state of the input data packet;
 d) A state of the data flow;
 e) Network policy data;
 f) Information of an event logged before the data packet is received;
 g) A state machine identifier (ID) identifying the respective state machine logic to apply to a given data packet; and
 h) Flow context (also denoted herein flow context information) which is meta-information about a data flow. The flow context is fixed for a given data flow, and is not based on current states and/or historical information relating to the data flow.

The flow context for a given data flow may include one or more of:
 a) The originating user;
 b) The ingress and egress parts of the flow;
 c) Text field;
 d) User ID;
 e) Quality of Service (QoS) policy;
 f) Service-level agreement (SLA) policy;
 g) Flow protection policy; and
 h) Other flows by the same user.

Optionally, state information is obtained at the FE by one or more of the following:
 a) Pushed by controller or other network element;
 b) Pulled by FE from controller or other network element;
 c) Packet sniffer (hardware and/or software) in the network;
 d) Query to a user or database; and
 e) Meta-data in data packet and/or frame.

Some of the state information may not be available to any element outside the FE. For example, effective load balancing within the FE requires knowledge of the current load distribution amongst the FE egress ports which is known only at the FE.

In 110, the data packet's next destination is selected at the FE by applying state machine logic to at least one field of the data packet and to the state information. The state machine logic includes rules for forwarding the data packet. In some embodiments of the present disclosure, some of the forwarding decisions are performed without consideration of the state information, and the state machine logic implements only the aspects which are state-dependent.

Optionally, the FE also uses the state machine logic to determine a set of actions (denoted herein an action set) which is executed on the data packet by the FE prior to forwarding the data packet. Examples of actions include selecting an egress port for the data packet, packaging at least some state information with the data packet selecting an idle time, generating frames relating to the data packet and inserting the generated frames into the data flow, dropping data packets and other actions known in the art.

In 120 the FE forwards the data packet to the identified next destination.

Optionally, the state machine logic is externally-programmable by a controller and/or through a user interface. Optionally when a new data flow is initiated and there is no appropriate state machine at the FE, the FE is externally-programmed with a state machine for the new data flow. In some embodiments of the disclosure, the first data packet in a data flow is sent by the FE to the controller. The controller determines when the FE requires programming with new state machine logic and programs the FE with the required state machine logic. The process may be repeated when the state machine logic needs to be updated during the data flow. Optionally the controller programs other network FEs with the new state machine logic.

Optionally, the controller programs the associated FEs with the state machine logic a priori to any traffic (denoted proactive mode). In alternate or additional embodiments the controller programs the associated FEs only when a first frame is detected (denoted reactive mode).

Figure 2:
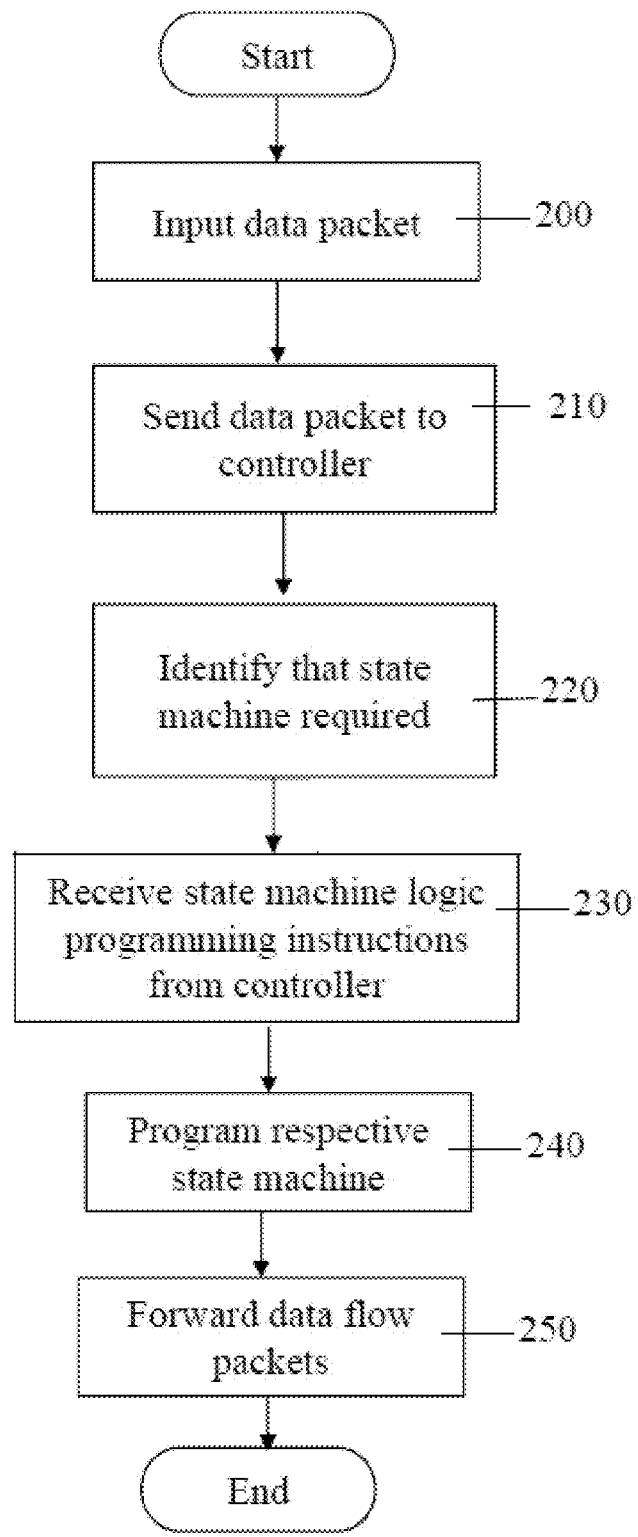
FIG. 2 is a simplified flowchart of a method for programming a state machine on an FE, according to embodiments of the present disclosure.

Reference is now made to FIG. 2, which is a simplified flowchart of a method for programming a state machine on an FE, according to embodiments of the present disclosure. In 200 a data packet is received at the FE.

In 210 the FE sends the data packet to the controller. For example the input data packet may be the first packet of a new data flow. In another example, the FE is not able to process the packet with a currently-programmed state machine, and new state machine logic is required at the FE. Not all data packets are sent to the controller by the FE.

In 220 the controller determines new state machine logic and sends programming instructions, and possibly additional data (such as initial state information), to the FE.

In 230 the programming instructions are received at the FE. In 240 a new state machine is programmed within the FE or an existing state machine is updated as needed. In 250 the FE forwards the data packets in the data flow in accordance with the new state machine is established.

An FE may include multiple state machines, where each state machine tracks states that are relevant to a respective data flow. It is necessary for the FE to determine which state machine should be used for a given data packet. In some embodiments of the present disclosure, the FE determines the state machine by matching at least one data packet field to a flow table which includes an identifier of the respective state machine.

Optionally, the FE stores the tracked state information in the flow table used by the respective state machine. The state information is updated when changes are detected.

Figure 3A:
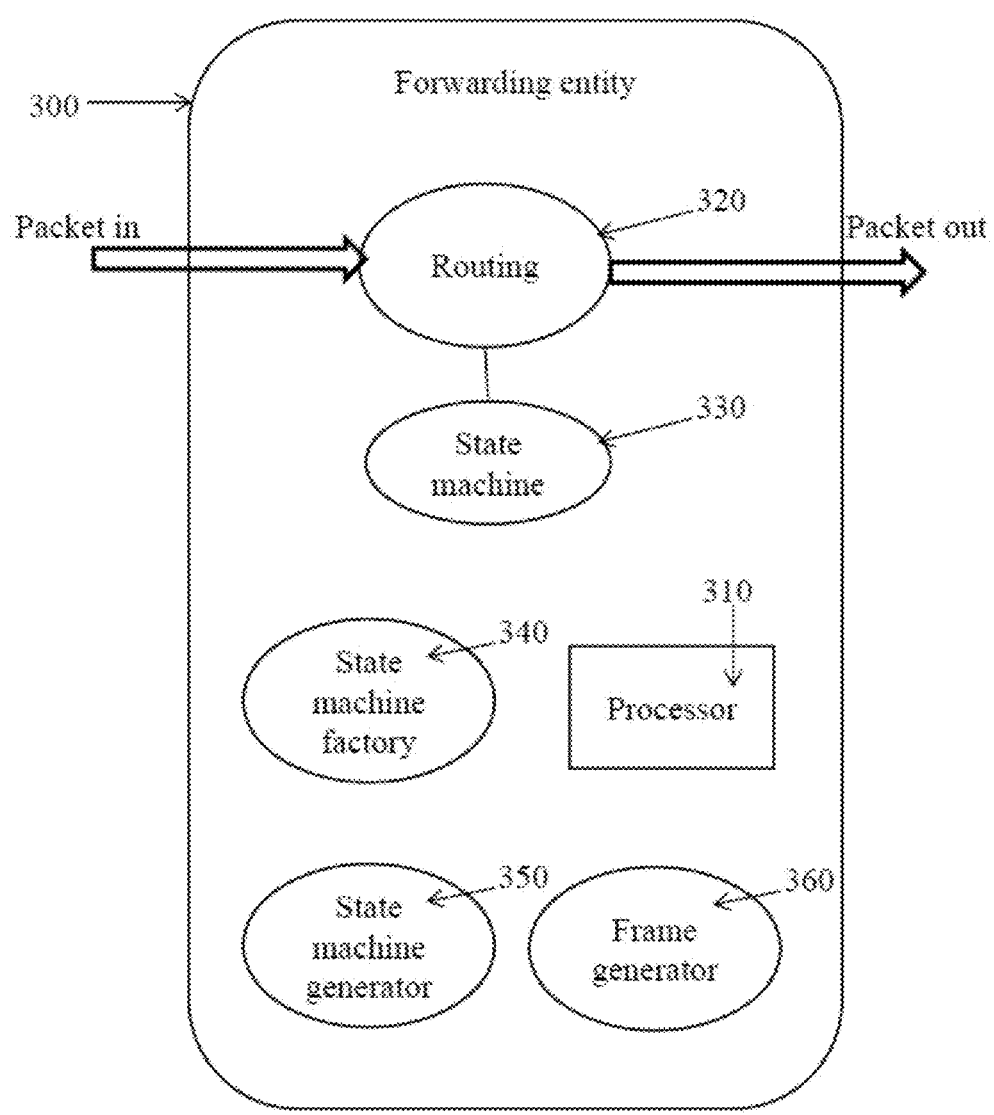
FIG. 3A is a simplified diagram of a data network FE for forwarding data packets, according to embodiments of the present disclosure.

Reference is now made to FIG. 3A which is a simplified diagram of a FE for forwarding data packets, according to embodiments of the present disclosure. The protocol used at the FE is adapted for locally-managed data forwarding in a software-defined networking (SDN) architecture. FE 300 includes a computer readable storage medium with program instructions executed by processor 310. FE 300 includes at least one ingress port for inputting data packets and at least one egress port for outputting data packets. FE 300 performs state-dependent routing on at least some of the data packets using state machine logic 330 as described above.

Figure 3B:
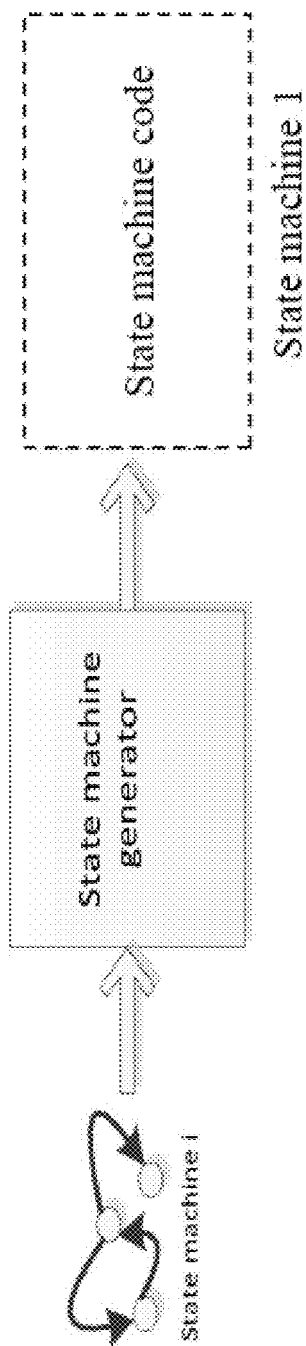
FIG. 3B illustrates an exemplary state machine generator translating a logical representation of a state machine into program code.

In some embodiments of the present disclosure, the FE includes at least one of the following:
a) State machine factory 340 is a module which maintains and runs the various state machines defined by the user. Optionally, state machine factory is programmed by a user through a user interface. In additional or alternate embodiments state machine factory 340 is programmed by an external system element such as the controller;
b) State machine generator 350 which provides a user interface which enables the user to define state machines in a logical manner and then creates the state machine using an internal interpreter. FIG. 3B illustrates an exemplary state machine generator translating a logical representation of a state machine into program code; and
c) Frame generator 360 which generates frames according to the state machine instructions. As opposed to the OpenFlow protocol which can only manipulate frames sent from other sources, the FE has the capability to generate frames for inclusion in the data flow. This may be useful for operations, administration and maintenance (OAM) operations that require generating and sending frames at specific intervals.

Extended OpenFlow Protocol with State-Dependent Forwarding

The OpenFlow protocol is an FE configuration protocol adapted for SDN. In the OpenFlow protocol flow tables are programmable and may be specified for each data flow. The term "flow table" denotes any type of dataset which stores information as required by the OpenFlow protocol and is not limited to data formatted as a table.

Optionally, the OpenFlow flow table concept is extended to a stateful flow table which tracks state information. It is thus possible to offload all or part of the flow and state processing to the FE while preserving the SDN global view of locally-managed forwarding at the forwarding entity. By offloading state information to the FE, the load on the SDN controller and applications is reduced in terms of frame processing. As there are fewer FEs than there are controllers or applications, the result is more efficient distributed frame processing. Moreover, the FEs may be better optimized for state machine processing by using multicore CPUs, GPUs etc.

An example of a stateless flow table compatible with the stateless OpenFlow protocol includes flow entries as shown in FIG. 4A.

Each flow table entry in FIG. 4A includes:
a) Match fields: to match against packets. These consist of the ingress port and packet headers and optionally metadata specified by a previous table.
b) Priority: matching precedence of the flow entry.
c) Counters: updated when packets are matched.
d) Instructions: to modify the action set or pipeline processing.
e) Timeouts: maximum amount of time or idle time before flow is expired by the FE.
f) Cookie: opaque data value chosen by the controller. May be used by the controller to filter flow statistics, flow modification and flow deletion. Not used when processing packets.

In some embodiments of the present disclosure, additional fields are included in at least one flow table (denoted herein a "stateful flow table") used by the FE. The additional fields include at least one entry tracking state information and at least one pointer to a respective state machine.

An exemplary stateful flow table is shown in FIG. 4B. Each stateful flow table entry in FIG. 4B includes the following:
a) Match fields: may include any type of frame information, including metadata, known headers, programmable headers, pointers to frame payload, etc.;
b) Flow notion (both ingress flow entry and egress flow entry are linked together into a unified flow context);
c) Flow context: Extendible, Type-Length-Value (TLV) based flow information which represents external information such as user information, policy information etc.;
d) State information: At least one TLV-based entry that represents the state(s) being tracked; and
e) State machine ID: At least one pointer to at least one state machine that tracks the states specific to the respective data flow.

The FE may use both stateful and stateless flow tables for forwarding a given data packet. When the data packet does not require state-dependent forwarding only stateless flow tables are used.

Optionally, at least one of the configured flow tables is a stateless flow table. Thus not all of the data flows must be processed by a computationally-intensive stateful flow table. This enables optimized implementation of the flow tables and the state machines. For example, application-specific integrated circuits (ASICs) are typically more optimized for fixed tables than for dynamic state machines. Thus stateless flow table processing may be performed by an ASIC, and stateful flow table processing may be performed by a Central processing unit (CPU) on the same FE (not by a specific ASIC).

Figure 5:
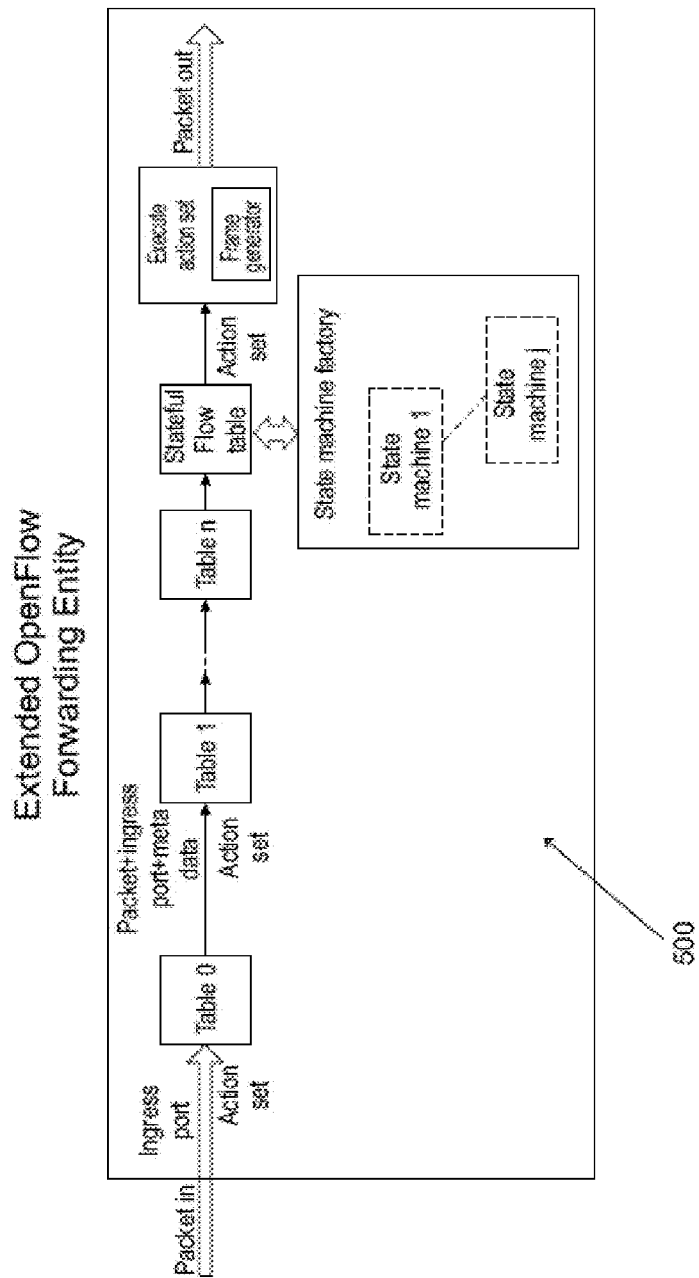
FIG. 5 is a simplified block diagram of an extended OpenFlow Forwarding Entity with state-dependent forwarding, according to embodiments of the disclosure.

Reference is now made to FIG. 5 which is a simplified block diagram of an extended OpenFlow FE with state-dependent forwarding, according to embodiments of the disclosure. Extended OpenFlow Forwarding Entity 500 may process a given data packet with OpenFlow stateless flow table(s) and with stateful flow table(s) as described herein.

An input data packet is processed at the FE by at least one stateful flow table. Optionally the FE further includes one or more stateless flow tables.

In the non-limiting example of FIG. 5 a single stateful flow table is the final flow table in the chain. However other embodiments may include multiple stateful flow tables. Optionally, a stateful flow table is present in the middle of a flow table chain, preceded and/or followed by a stateless flow table.

The FE also includes a module for executing the execute action set resulting from the flow table processing.

The stateful flow table processes the input data packet with state machine(s) which are maintained and run by the state machine factory.

Information for each state change may be provided to the controller and/or saved in the FE for asynchronous query.

Figure 6:
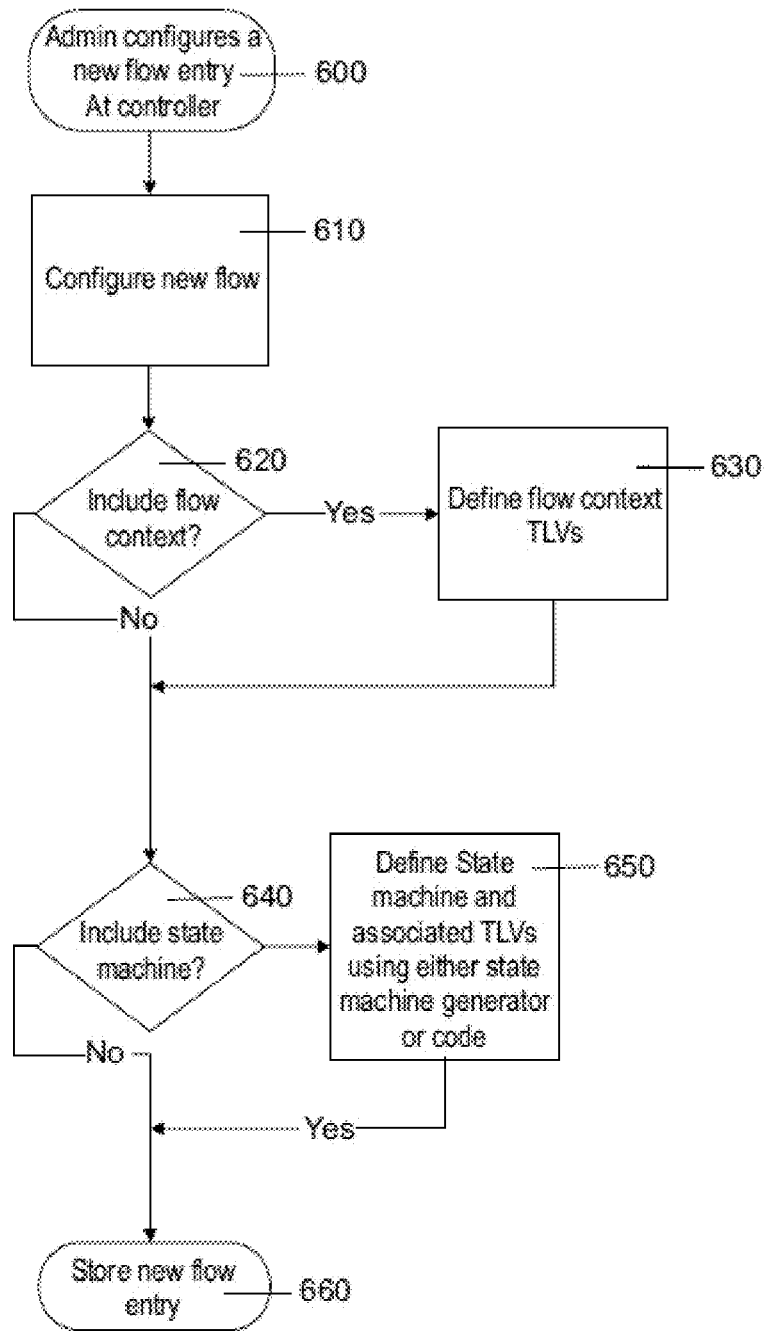
FIG. 6 is a simplified flowchart of a method for configuring a new data flow, according to embodiments of the present disclosure.

Reference is now made to FIG. 6, which is a simplified flowchart of a method for configuring a new data flow, according to embodiments of the present disclosure. When the user initially configures the controller for a new flow the user may include at least one stateful flow tables and/or state machine information. The state machine may be included as direct code or generated using a state machine generator.

In 600 the administrator begins configuring a new flow entry. The administrator may configure the new flow entry at a controller or at any network element capable of sending the new flow entry to associated FEs for which this flow entry is relevant. In 610 a new flow is configured. In 620 the administrator determines whether a flow context should be included. When a flow context should be included, in 630 the flow context TLV entries are defined. In 640 the administrator determines whether a state machine should be included. When a state machine should be included, in 650 the state machine and the associated TLV entries are defined. The definition may be performed by any method known in the art, including a state machine generator as described herein or as code.

The new flow entry is then stored in 660.

In a proactive mode the controllers sends the entire configuration to the associated FEs a priori to any traffic. In a reactive mode this information is sent only when a first frame is detected.

Figure 7:
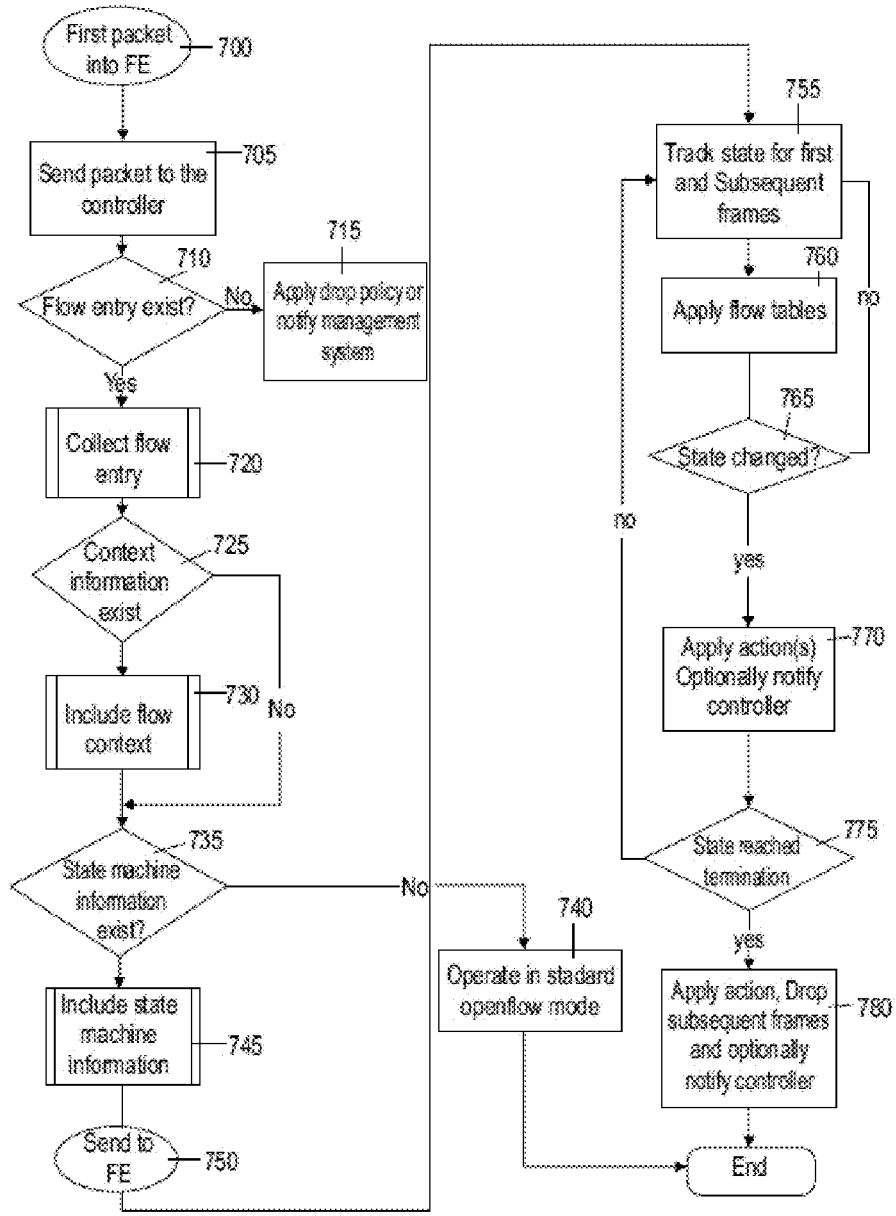
FIG. 7 is a simplified flowchart of a method for forwarding a data flow, according to embodiments of the disclosure.

Reference is now made to FIG. 7, which is a simplified flowchart of a method for forwarding a data flow, according to embodiments of the disclosure. FIG. 7 includes operations performed at the FE and the controller. The flowchart includes both stateless and state-dependent forwarding, depending on whether state information exists (see 735).

In 700 the first data packet enters the FE and is sent by the FE to the controller in 705.

In 710 the controller determines whether a flow entry exists for the data packet. When no flow entry exists for the data packet, in 715 a drop policy is applied and/or the management system is notified. When there is a flow entry, the flow entry is collected by the controller in 720.

In 725 the controller determines whether flow context information exists. When flow context information exists, the controller includes the flow context with the data packet in 730.

In 735 the controller determines whether state machine information exists. When state machine information exists, the controller includes the state machine information with the data packet in 745 and returns the data packet and all included information to the FE in 750. When no state machine information exists, the data packet is processed by the FE according to the stateless protocol (e.g. OpenFlow) in 740.

State-dependent forwarding performed by the FE is shown in 755-780.

In 755 the FE tracks state information. In some embodiments of the present disclosure, when a first data packet of the data flow is received from the controller the initial values of at least some the state information are entered into respective stateful flow table fields.

In 760 one or more flow tables are applied by the FE to the data packet. The flow tables include at least one stateful flow table and may further include one or more stateless flow tables.

In 765 the FE determines whether state information has changed. When no state information has changed, processing continues at 755. When state information has changed, in 770 the FE performs the required actions. These actions may include updating the stateful flow table(s). Optionally, the controller is notified.

In 775 the FE switch determines whether the state has reached termination. When the state has reached termination, in 780 any further required operations are applied, subsequent frames are dropped and the controller may be notified. When the state has not reached termination, processing continues at 755.

Figure 8:
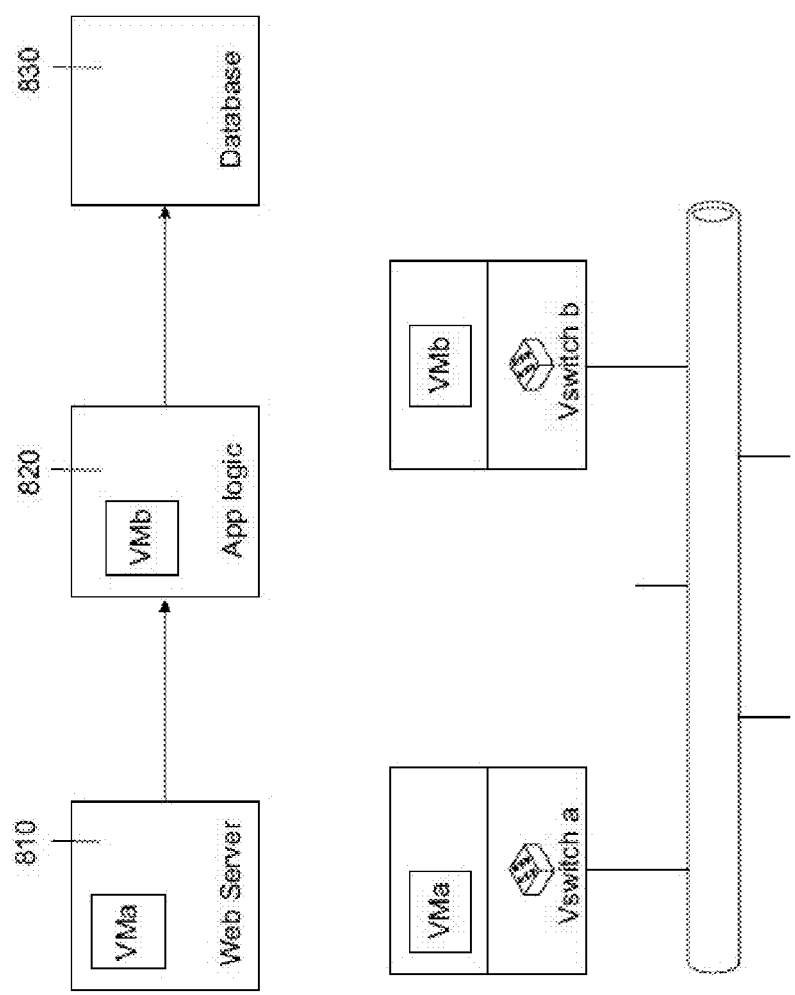
FIG. 8 is an illustrative example of implementing an extended OpenFlow protocol on a three tier web application.

Reference is now made to FIG. 8 which is an illustrative example of implementing an extended OpenFlow protocol on a three tier web application. The present example demonstrates how stateful data forwarding of the embodiments described herein provides solutions to problems which cannot be achieved with a stateless OpenFlow protocol.

A common cloud application is a web application which is composed of three tiers:
a) Web server 810;
b) App Logic 820; and
c) Database 830.

In the example of FIG. 8, for security reasons Web server 810 may initiate connection to App Logic 820 but App Logic 820 may not initiate connection to Web server 810. This means that VMa may initiate a connection to VMb, but not vice versa.

In a stateless OpenFlow implementation of a firewall it is possible to include a rule that when a first frame comes from VMa with a destination of VMb communication is allowed in both directions, however when the first frame comes from VMb to VMa communication is not allowed. The problem with the stateless firewall occurs when traffic is allowed from VMa to VMb in both directions regardless of the state of the Transmission Control Protocol (TCP) connection. In that case VMb may communicate with VMa even after the TCP session has ended.

As known in the art, a TCP connection has several states such as: closed, listen, Syn received, established etc. In the present example it is desired to allow traffic from VMb to VMa only when the TCP connection state is "established". In order to achieve this, the TCP state is tracked as a TLV entry in the stateful flow table. The state machine used is a TCP state machine which is identified in the stateful flow table. The TCP connection state may be inferred from the TCP flags (e.g. syn, ack, fin etc.) and the sequence in which they appear in the traffic.

The methods as described above may be used in the fabrication of integrated circuit chips.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant networks, protocols, SDNs, network elements, forwarding elements, switches, routers, state machine logics and state machines will be developed and the scope of the terms network, protocol, SDN, network element, forwarding element, switch, router, state machine logic and state machine is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Throughout this application, various embodiments of this disclosure may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

What is claimed is:

1. A method for forwarding data packets, the method comprising:
    forwarding, by a controller, a data flow of a plurality of data packets according to a protocol adapted for locally-managed data forwarding in a software-defined networking (SDN) architecture;
    entering, by the controller, each data packet of the plurality of data packets to a data communication forwarding entity (FE);
    storing, by the data communication FE, at least one data packet of the plurality of data packets,
    wherein a next destination of the stored at least one data packet of the plurality of data packets is selected by the data communication FE by applying state machine logic to (a) at least one field of the stored at least one data packet and (b) state information tracked by the data communication FE before the at least one data packet is received, wherein the state machine logic comprises rules for forwarding the at least one data packet; and forwarding, by the controller, the at least one data packet to the selected next destination.

2. The method according to claim 1, wherein the applying state machine logic determines actions to be executed on the at least one data packet wherein the actions are executed by the data communication FE on the at least one data packet before forwarding the at least one data packet to the selected next destination.

3. The method according to claim 1, wherein the state information comprises at least one of the following:
a network state of a network transferring the at least one data packet from a sender of the at least one data packet to a destination of the at least one data packet,
an FE state of the data communication FE,
a packet state of the at least one data packet,
a data flow state of a data flow comprising the at least one data packet,
policy data of the network,
event information of an event logged before the at least one data packet is received,
a state machine identifier (ID) identifying a respective state machine logic to apply to the at least one data packet, and
flow context of the at least one data flow.

4. The method according to claim 1, further comprising: defining, upon initiation of the at least one data flow, associated state machine logic for applying to the plurality of at least one data packets of the at least one data flow.

5. The method according to claim 1, further comprising: determining that current state machine logic requires updating, and updating the state machine logic prior to applying the state machine logic to the at least one data packet.

6. The method according to claim 1, further comprising: packaging at least a part of state information with the at least one data packet before forwarding the at least one data packet to the selected next destination.

7. The method according to claim 1, further comprising: generating frames at the data communication FE for forwarding to the next destination, in accordance with instructions of the state machine logic.

8. The method according to claim 1, further comprising: determining the state machine logic to be applied to the at least one data packet by matching at least one field of the at least one data packet to a flow table maintained by the data communication FE, wherein the flow table includes an identifier of associated state machine logic for the at least one data packet.

9. The method according to claim 8, wherein the flow table includes at least one field for storing state information, and the method further comprises: tracking the state information of the data flow and updating the at least one field in the flow table when a change to the tracked state information is detected.

10. A software-defined network (SDN) controller for state-dependent data forwarding, wherein the controller comprises a hardware processor and a non-transitory computer readable medium including processor-executable instructions which when being executed cause the hardware processor to implement the following:
forwarding a data flow of a plurality of data packets, according to a protocol adapted for locally-managed data forwarding in an SDN architecture;
entering, each data packet of the plurality of data packets to a data communication forwarding entity (FE);
storing, by the data communication FE, at least one data packet of the plurality of data packets, wherein a next destination of the at least one data packet of the plurality of data packets is selected by the data communication FE, by applying state machine logic to (a) at least one field of the data packet and (b) state information tracked by the data communication FE before the data packet is received, wherein the state machine logic comprises rules for forwarding the data packet; and
forwarding the data packet to the selected next destination.

11. The software-defined network (SDN) controller according to claim 10, wherein the instructions of applying state machine logic further comprises: determining actions to be executed on the data packet, wherein the actions are executed by the data communication FE on the data packet before forwarding the data packet to the selected next destination.

12. The software-defined network (SDN) controller according to claim 10, wherein the state information comprises at least one of the following:
a network state of a network transferring the data packet from a sender of the packet to a destination of the data packet,
an FE state of the data communication FE,
a packet state of the data packet,
a data flow state of a data flow comprising the data packet,
policy data of the network,
event information of an event logged before the data packet is received,
a state machine identifier (ID) identifying a respective state machine logic to apply to a data packet, and
flow context of the data flow.

13. The software-defined network (SDN) controller according to claim 10, wherein the instructions further causes the processor to implement: defining, upon initiation of the data flow, associated state machine logic for applying to the plurality of data packets of the data flow.

14. The software-defined network (SDN) controller according to claim 10, wherein the instructions further causes the processor to implement: determining that current state machine logic requires updating, and updating the state machine logic prior to applying the state machine logic to the data packet.

15. The software-defined network (SDN) controller according to claim 10, wherein the instructions further causes the processor to implement: packaging at least a part of state information with the data packet before forwarding the data packet to the selected next destination.

16. A data network forwarding entity (FE) for data forwarding, comprising:
at least one ingress port configured to input data packets;
a memory configured to store at least one data packet,
a hardware processor configured to process the at least one data packet, according to a protocol adapted for locally-managed data forwarding in a software-defined networking (SDN) architecture, to identify associated next destinations of the at least one data packet; and
at least one egress port configured to forward the at least one data packet to the associated next destinations;
wherein the processor selects a next destination of the at least one data packet by applying state machine logic to at least one field of the data packet using state information tracked by the FE before the data packet is received, wherein the state machine logic comprises rules for at least one of: (a) forwarding the data packet and (b) determining actions to be executed on the data packet by the FE.

17. The data network FE according to claim 16, wherein the state information comprises at least one of:
- a network state of a network transferring the data packet from a sender of the data packet to a destination of the data packet,
- an FE state of a data communication FE,
- a packet state of the data packet,
- a data flow state of a data flow comprising the data packet,
- policy data of the network,
- event information of an event logged before the data packet is received,
- a state machine identifier (ID) identifying an associated state machine logic to apply to the data packet, and
- flow context of the data flow.

18. The data network FE according to claim 16, wherein the hardware processor is further configured to generate the state machine logic from data comprised in the data packet.

19. The data network FE according to claim 16, wherein the hardware processor is further configured to:
- input information from a user defining a state machine, using a user interface; and
- generate the state machine logic from the user-defined state machine.

20. The data network FE according to claim 16, wherein the hardware processor is further configured to: select the state machine logic to be applied to the data packet, by matching at least one field of the data packet to a flow table maintained by the FE, wherein the flow table includes an identifier of the state machine logic.

* * * * *